(12) United States Patent
Pravetz

(10) Patent No.: US 6,205,549 B1
(45) Date of Patent: Mar. 20, 2001

(54) ENCAPSULATION OF PUBLIC KEY CRYPTOGRAPHY STANDARD NUMBER 7 INTO A SECURED DOCUMENT

(75) Inventor: James D. Pravetz, Sunnyvale, CA (US)

(73) Assignee: Adobe Systems, Inc., San Jose, CA (US)

( * ) Notice: Subject to any disclaimer, the term of this patent is extended or adjusted under 35 U.S.C. 154(b) by 0 days.

(21) Appl. No.: 09/143,022

(22) Filed: Aug. 28, 1998

(51) Int. Cl.[7] .................................................. G06F 1/24

(52) U.S. Cl. ........................ 713/182; 380/259; 380/260; 380/283

(58) Field of Search .................................... 713/152, 161, 713/168, 169, 171, 182; 380/277, 278, 259, 260, 283

(56) References Cited

PUBLICATIONS

RSA Data Security, Inc. Public–Key Cryptography Standards (PKCS) "PKCS #7: Cryptographic Message Syntax Standard".*

* cited by examiner

*Primary Examiner*—Thomas R. Peeso
(74) *Attorney, Agent, or Firm*—Blakely, Sokoloff, Taylor & Zafman

(57) ABSTRACT

A secured access to data in a portable document format (PDF) file is provided by encapsulating a Public Key Cryptography Standard number 7 (PKCS#7) object having a recipient list into data. 'Enveloped data' encapsulated in the PKCS#7 object contains access information that is used to access the remainder of the document into which the PKCS#7 object is encapsulated. The access information can be decrypted by all recipients in the PKCS#7 recipient list. If a recipient listed in the recipient list attempts to access data in the document, the access information is decrypted using the recipient's private key. The access information is used to obtain an access key that is used to decrypt data in the document.

34 Claims, 8 Drawing Sheets

ENCAPSULATION OF PUBLIC KEY CRYPTOGRAPHY STANDARD NUMBER 7 INTO A SECURED DOCUMENT

BACKGROUND OF THE INVENTION (1) Field of the Invention

The present invention is related to the field of providing secured access to documents, more specifically, the method and apparatus of the present invention is related to utilizing a Public Key Cryptography Standard number 7 (PKCS#7) object to provide recipients secured access to encrypted data.

(2) Related Art

Portable document format (PDF) is a file format utilized to represent a document in a manner independent of the application software, hardware and operating system used to create it. A document is converted into a PDF document/data by a PDF writer. A PDF document/data contains one or more pages, each page in the document containing a combination of text, graphics and images and may also contain information such as hypertext links, sound and movies. A user may view and edit a PDF document/data through a graphical user interface (GUI) provided by a PDF viewer application. To access a secured PDF document/data, a user must provide the PDF viewer application with a valid password.

Public Key Cryptography Standard number 7 (PKCS#7) is an object specification from RSA Data Securities, Inc. of San Mateo, Calif. A PKCS#7 object is binary encoded and contains various attributes. When used to encrypt data, a PKCS#7 object is designed to encapsulate a single encrypted copy of the data to be encrypted. A PKCS#7 object also contains a list of recipients for access to the data. For each recipient, an encrypted key that may be used to decrypt the encrypted access information is provided. The key is encrypted using the recipient's public key.

The currently available method of providing a user secured access to a PDF document/data by use of a password is disadvantageous in that passwords must be available to all recipients, rather than distribution being designed based around a recipient list that uses public-key private key technology. PKCS#7 standard for providing secured access to a document is advantageous in that the PKCS#7 provides the use of public-key private key technology and thereby obviates the use of passwords. However, PKCS#7 defines the data to be encrypted as being encapsulated by a PKCS#7 object.

It is therefore desirable to have a method and apparatus to incorporate the advantages found in PKCS#7 standard into providing secured access to a PDF document/data in a PDF file and overcome the disadvantages of the PKCS#7's forced document encapsulation.

BRIEF SUMMARY OF THE INVENTION

In the present invention, secured access to a document is controlled using a Public Key Cryptography Standard number 7 (PKCS#7) object that is embedded into the document. The PKCS#7 object contains a recipient list and access rights for a recipient. One embodiment of the current invention is its use in documents with a format specification defined by the Portable Document Format (PDF) specification. The PDF format specification is well known in the art.

Currently, PKCS#7 is defined for an 'enveloped data' that is encapsulated in the PKCS#7 object to contain the document data. In the invention, the 'enveloped data' contains access information that is used to access the remainder of the document into which the PKCS#7 object is encapsulated.

The access information can be decrypted by all recipients in the PKCS#7 recipient list. If a recipient listed in the recipient list attempts to access data in a document, the access information is decrypted using the recipient's private key. The access information is used to obtain an access key that is used to decrypt data in the document.

DETAILED DESCRIPTION OF THE INVENTION

The present invention is a method and apparatus to incorporate PKCS#7 standard into a portable document format (PDF) file to provide recipients secured access to PDF document/data. Although the present invention is discussed herein in the context of the preferred embodiment, namely the invention as applied to PDF files, it can be appreciated by a person skilled in the art given the detailed description provided herein that the present invention may be equally applicable to documents or data files using other formats.

Figure 1A:
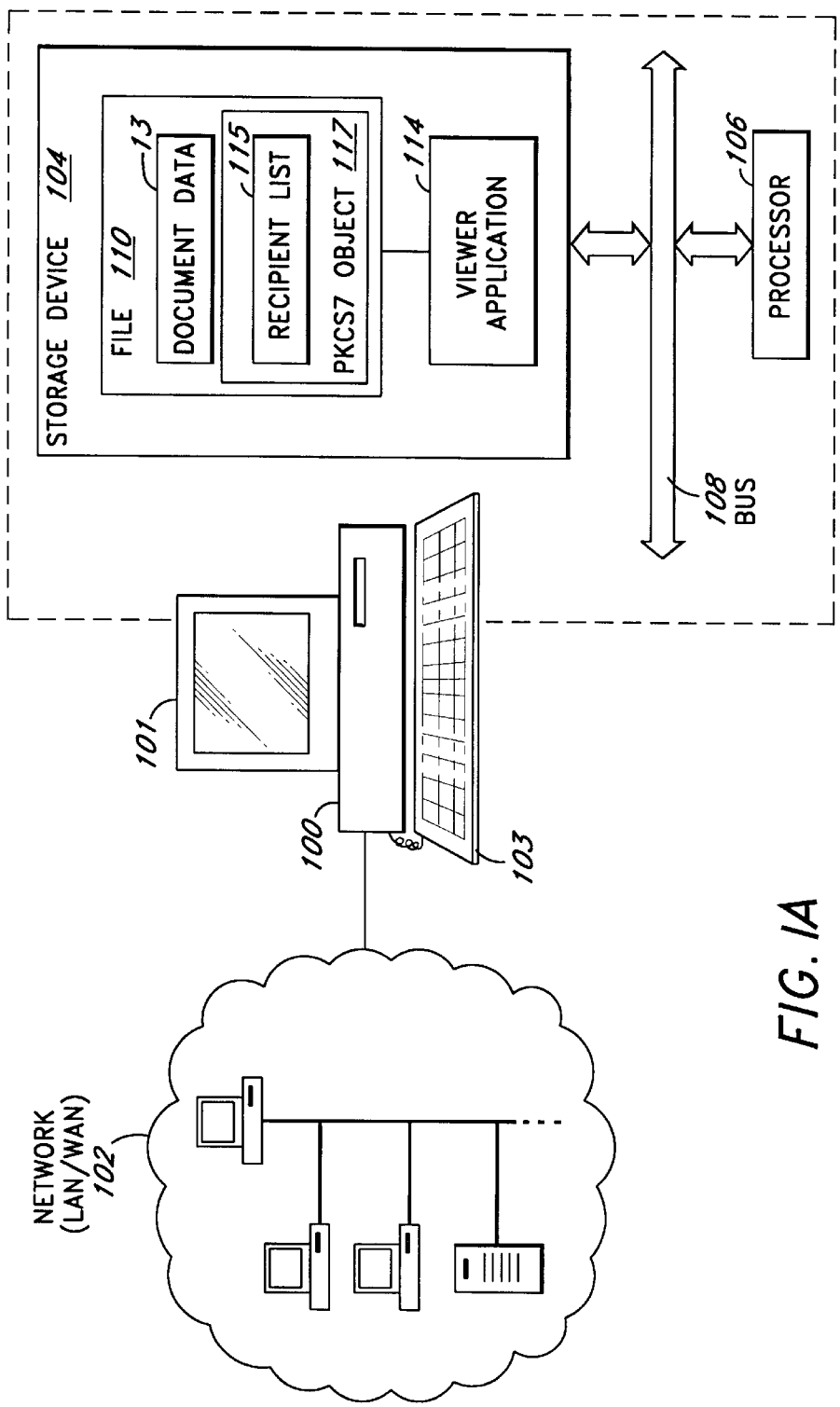
FIG. 1a illustrates an exemplary embodiment of a computer system with a file encapsulating a PKCS#7 object.

FIG. 1a illustrates an embodiment of a computer system with the method and apparatus of the present invention. A computer 100 with a display device, such as a monitor 101 and an input device, such as a keyboard 103, is coupled to a network 102 such as a local area network (LAN) or a wide area network (WAN). The network 102 provides the computer 100 with communication to other computers and servers connected through the network 102. The network can be used as a method of distribution of a secured document.

The computer 100 has a storage device 104 coupled to a processor 106 by a bus or busses 108. The storage device 104 has document data 113 residing in a file 110 and a PKCS#7 object 117 with a recipient list 115.

The present invention encapsulates the PKCS#7 object 117 into the file 110 to provide secured access to the document data 113 to recipients listed in the recipient list 115.

Figure 1B:
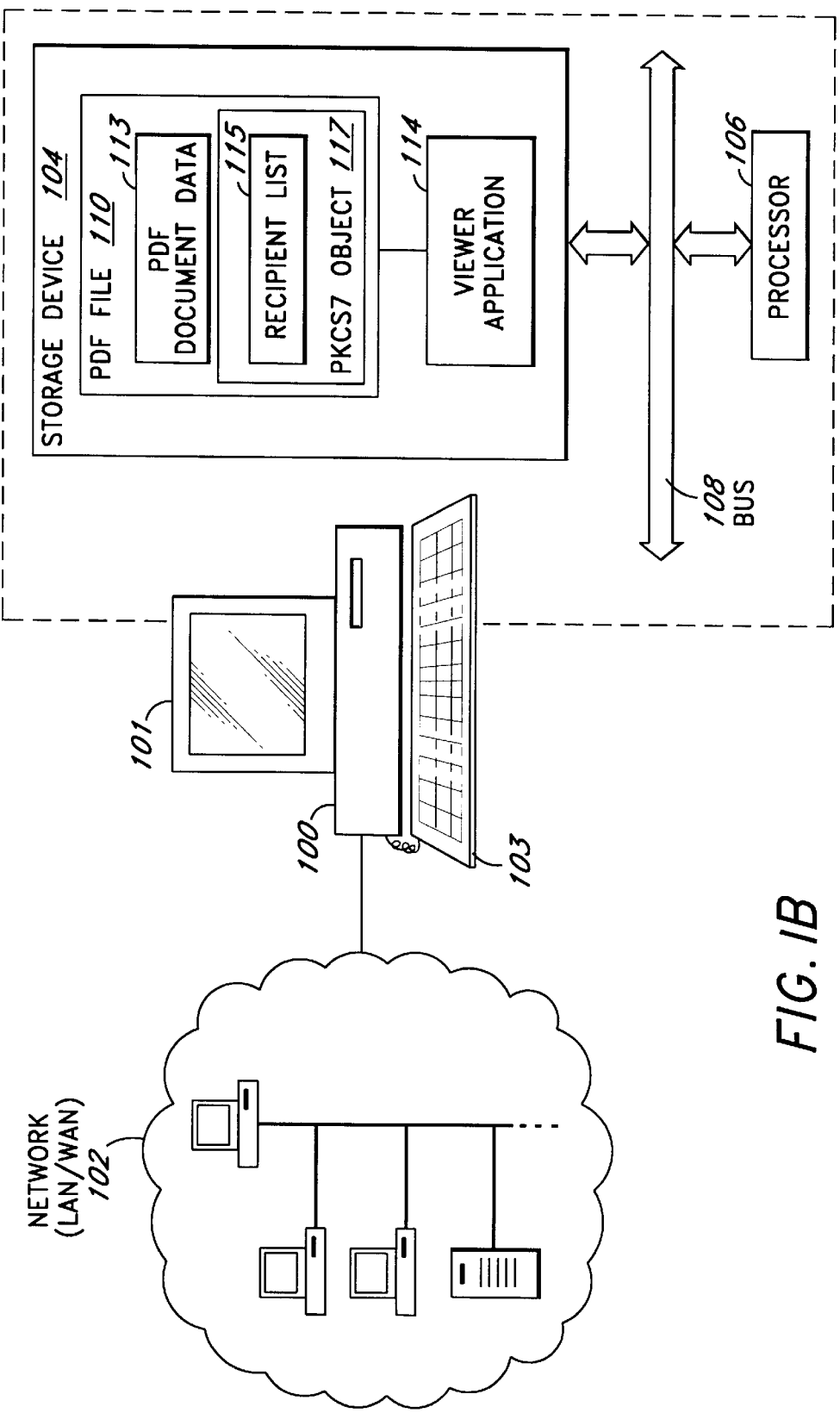
FIG. 1b illustrates an alternate embodiment of a computer system with a PDF file encapsulating a PKCS#7 object.

FIG. 1b illustrates the preferred embodiment of the present invention. In this embodiment, the storage device 104 has a portable document format (PDF) file 110 with a PDF document/data 113 and a PKCS#7 object 117 with a recipient list 115.

PDF is a file format utilized to represent a document in a manner independent of the application software, hardware and operating system used to create it. A PDF document/data 113 contains one or more pages, each page in the document containing a combination of text, graphics and images. A PDF document/data 113 may also contain information such as hypertext links, sound and movies.

The PDF document/data 113 may be browsed or viewed through a PDF viewer application 114 providing a graphical user interface (GUI). Adobe Acrobat Exchange™ or Acrobat Reader applications, both made available by Adobe Systems, Inc. of San Jose, Calif. are exemplary PDF viewer applications 114.

The present invention encapsulates the PKCS#7 object 117 into the PDF file 110 to provide secured access to document data 113 that is contained in the PDF file 110 to recipients listed in the recipient list 115.

In an alternate embodiment, object 117 is any data encapsulating and encrypting object with the characteristics of a PKCS#7 object.

The remainder of the detailed description will be described in reference to the preferred embodiment of the present invention illustrated in FIG. 1b. However, it can be appreciated by a person skilled in the art that other equally applicable embodiments may be derived given the detailed description provided herein.

Figure 2:
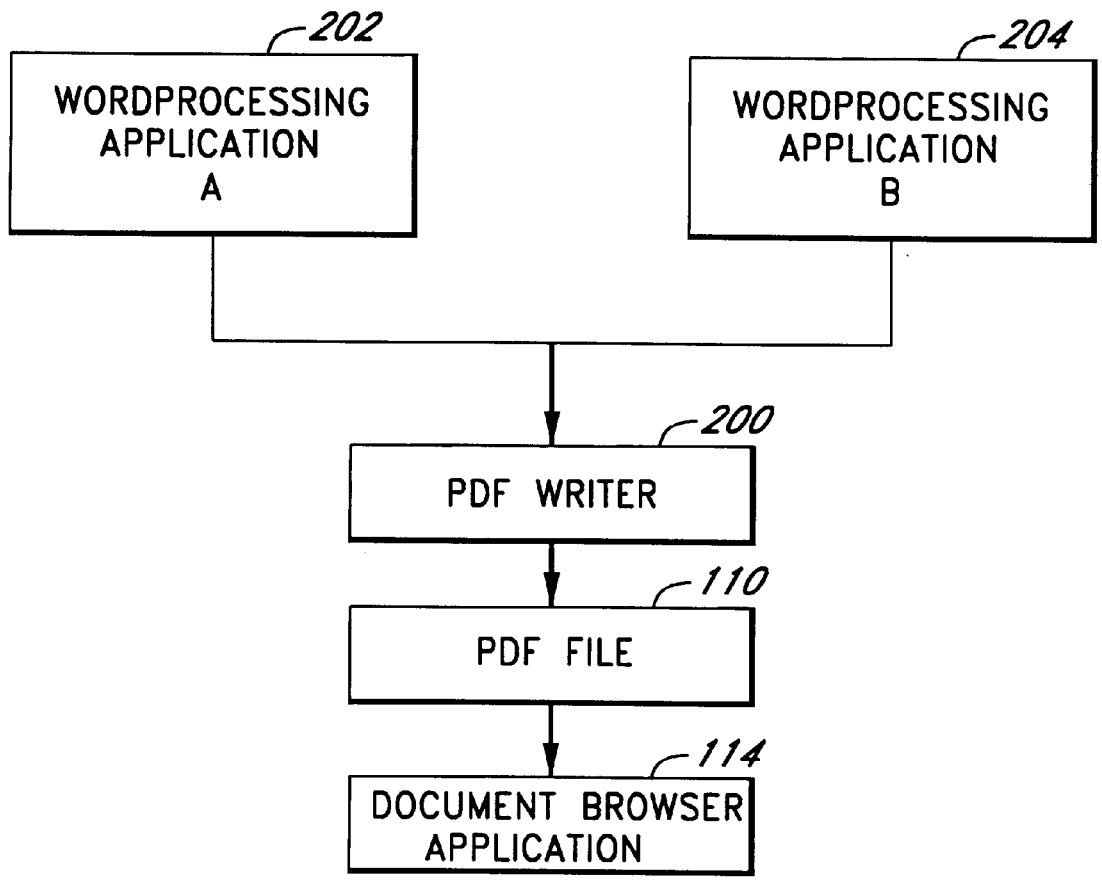
FIG. 2 illustrates the method by which a PDF file is created.

FIG. 2 illustrates one exemplary embodiment of the creation of a PDF file is created. A PDF writer application 200 available on both Apple® MacIntosh® and IBM®-compatible computers using the Microsoft Windows™ environment. The PDF writer application 200 converts operating system graphics and text commands generated by an application A 202 or application B 204 to PDF operators and embeds them in a PDF file as illustrated in FIG. 2. The PDF files generated are platform independent and may be viewed by a PDF viewer application on any supported platform.

Figure 3A:
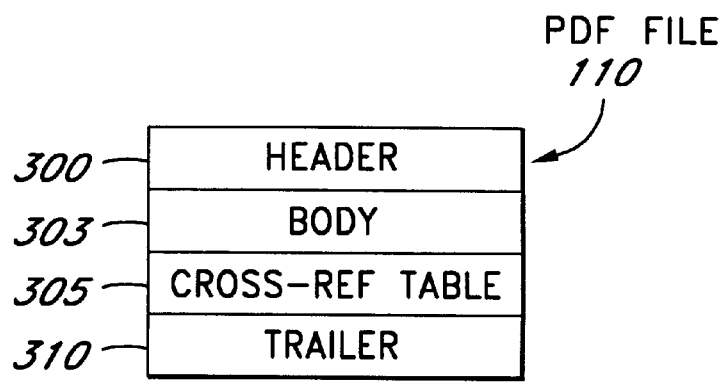
FIG. 3a illustrates the PDF file structure.

FIG. 3a illustrates an embodiment of the PDF file 110 file structure. A header 300 specifies the version number of the PDF specification to which the PDF file adheres. A body 303 of a PDF file 110 consists of a sequence of indirect objects representing a document. The objects represent components of the PDF document/data, such as fonts, pages and sampled images. A cross-reference table 305 contains information which permits random access to indirect objects in the file, such that the entire file need not be read to locate any particular object. Finally, a trailer 310 enables an application reading a PDF file 110 to quickly find the cross-reference table and to locate special objects.

Figure 3B:
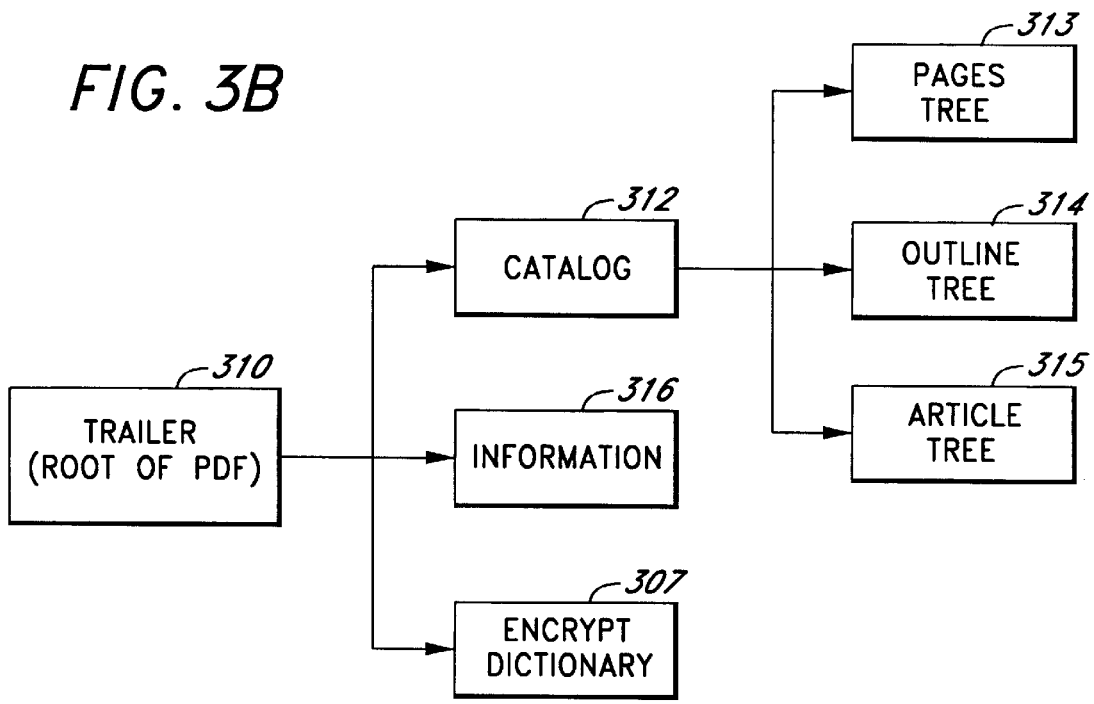
FIG. 3b illustrates an embodiment of a PDF object organization having an encrypt dictionary with the encapsulated PKCS#7 object of the present invention.

FIG. 3b illustrates an embodiment of a PDF object organization. The body of the PDF file 110 consists of a sequence of objects that collectively represent a single PDF document/data 113. An exemplary PDF file 110, as illustrated in FIG. 3b has a trailer object 310 which specifies the locations of the catalog object 312, the information object 316 and encrypt dictionary object 307.

Object as referred herein connotes different representations of data. PDF supports seven basic types of objects, namely Boolean, numbers, strings, names, arrays, dictionaries and streams. Catalog object 312, the information object 316 and the encrypt dictionary object 307 are all objects of type dictionaries.

A dictionary object is an associative table containing pairs of objects. The first element of each pair is referred to as a key and the second element of each pair is referred to as a value. A key is a name or object identifier. A value can be any kind of object, including another dictionary. A dictionary is generally utilized to collect and tie together attributes of a complex object with each key value pair specifying the name and value of an attribute.

The catalog object 312 references a pages object 313, an outline object 314 and an article object 315. The pages object 313 provides the various pages in the PDF document/data 113. The outline object 314 specifies a linked list of objects that are table of contents entries that can be used to quickly navigate to sections of a document. The article object 315 specifies a linked list of objects that are used to provide a navigation method for following threads of articles in a document.

The information dictionary object 316 is a structure which contains general information about the PDF document/data 113, including title and author of the document and the last modified date of the document.

Finally, the encrypt dictionary object 307 specifies the security handler to be used to authorize access to a given PDF document/data 113. There can be any number of security handlers available to control access to a PDF file 110. This invention pertains to a particular security handler design.

Figure 4:
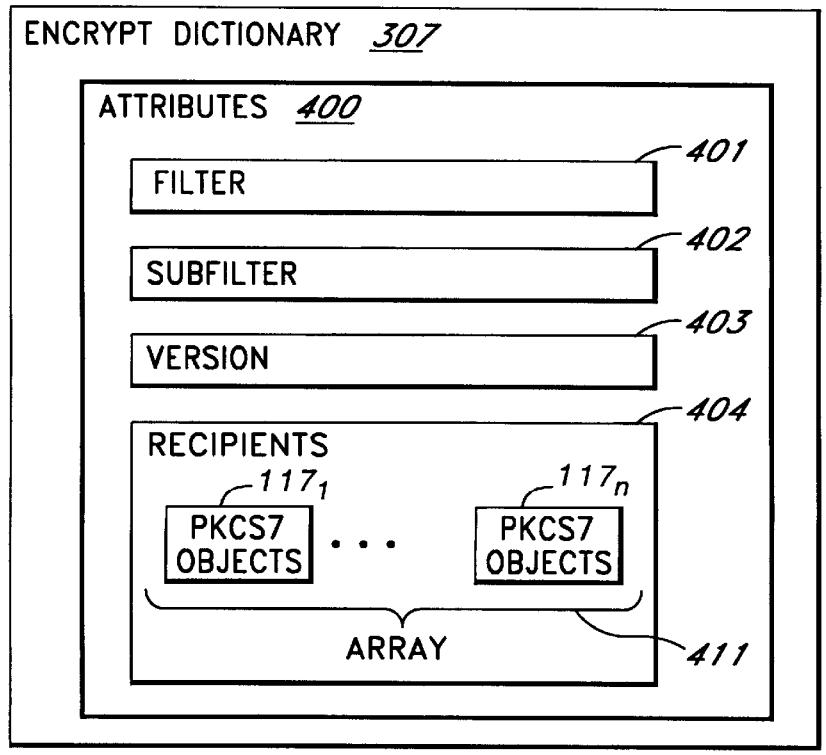
FIG. 4 illustrates an embodiment of an encrypt dictionary of the present invention.

FIG. 4 illustrates an embodiment of an encrypt dictionary with the security handler of the present invention. The encrypt dictionary object 307 contains various attributes 400. The filter attribute 401 indicates the security handler that is to be used to process the encrypt dictionary 307 contents. The sub-filter attribute 402 indicates the standardized syntax or format of the encrypt dictionary 307 contents. The version attribute 403 specifies the version of the security handler that is being used. Attributes 400 also has a recipients attribute 404 that contains an array 411 of PKCS#7 objects $117_1 \ldots 117_N$.

PKCS#7 is a Public Key Cryptographic Standard from RSA Data Securities, Inc. of San Mateo, Calif. PKCS#7 is an object specification where the object is binary encoded and contains various attributes. When used to encrypt data, a PKCS#7 object is designed to encapsulate a single encrypted copy of the data to be encrypted. The PKCS#7 object also contains a list of recipients for the data and for each recipient, an encrypted key that can be used to decrypt the encrypted access information. The encrypted key is encrypted using the recipient's public key.

An exemplary encrypt dictionary 307 implementation is as follows:

<</Filter Adobe.PPKEF
/Subfilter/adobe.pkcs7.s3
/V1
Recipients [(. . . binary data containing PKCS#7 object for recipients . . . ) . . . (. . . binary data containing PKCS#7 object for recipients . . . )]>>

The PKCS#7 objects are ordered into an array 411 of PKCS#7 objects $117_1 \ldots 117_N$. The first PKCS#7 object 117 may, for example, contain all recipients that have 'owner' or full access permissions (e.g. print, edit, select text/graphics, fill in forms) to a PDF document/data 113. Subsequent entries in the array will contain PKCS#7 objects that contain lists of recipients where all recipients listed within the same PKCS#7 object have identical parameters.

The PKCS#7 object 117 also contains information used in the generation of a key that decrypts the PDF document/data 113 in the PDF file 110.

Figure 5:
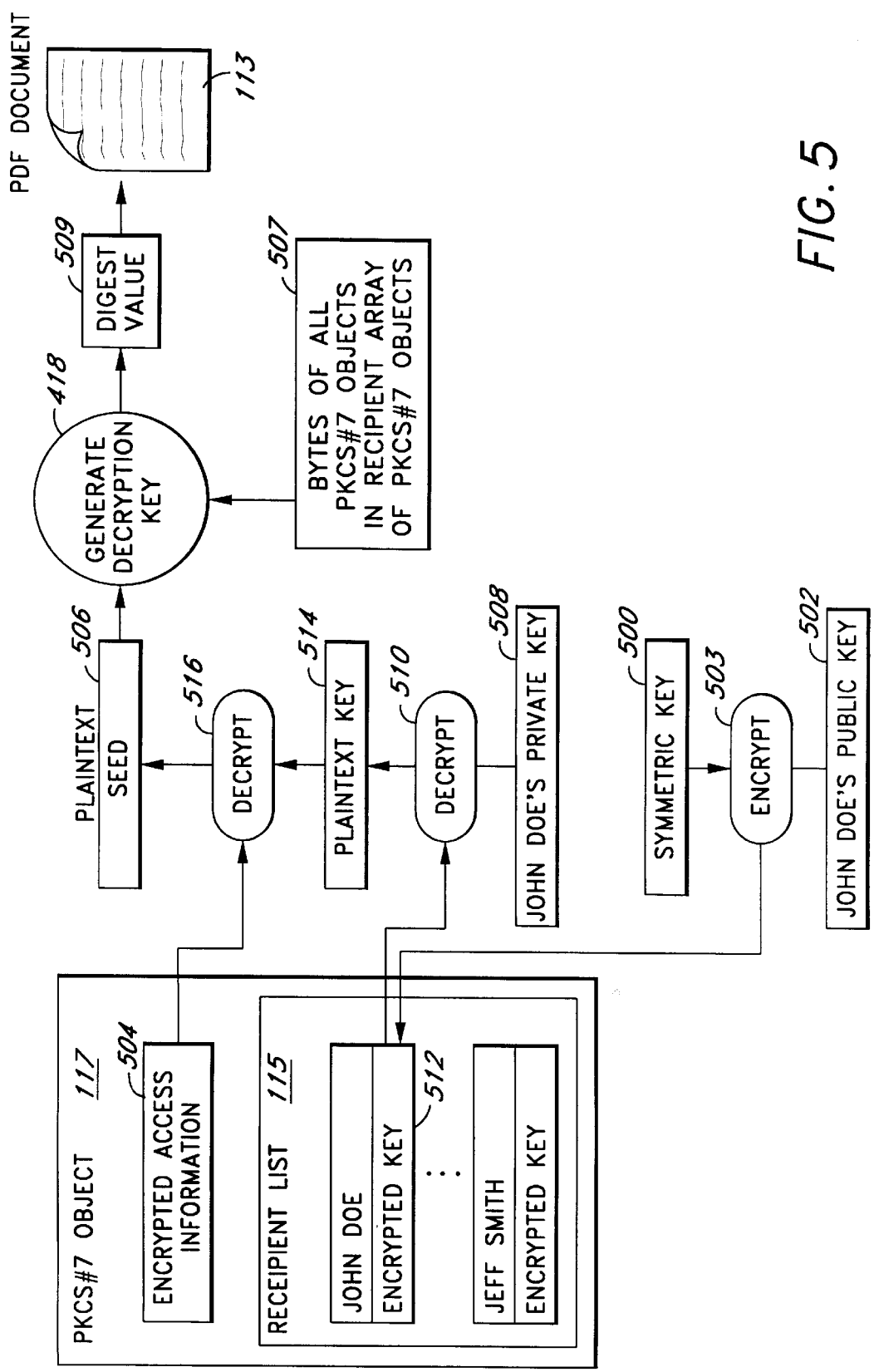
FIG. 5 is a block diagram illustrating the method by which a PKCS#7 object encapsulated in the PDF file is utilized to provide a recipient secured access to a PDF document/data.

FIG. 5 is a block diagram illustrating the method by which a PKCS#7 object encapsulated in the PDF file is utilized to provide a recipient secured access to a PDF document/data. Public key encryption allows multiple recipients to be specified for a document. A recipient list 115 in a PKCS#7 object 117 may list a plurality of recipients. A symmetric key 500 is encrypted once for each recipient listed in the recipient list 115 using each recipient's public key 502 to generate an encrypted key 512 for each recipient.

When the PDF viewer application 114 detects a recipient attempting to access a PDF document/data 113, the PDF viewer application 114 looks at the recipient list 115 for the PDF document/data 113 and determines whether the recipient is listed. If the recipient is listed in the recipient list 115 of the PDF document/data 113, then the PDF viewer application 114 accesses the recipient's private key 508 and decrypts the encrypted key 512 using the private key 508 to generate a plain text key 514. The plain text key 514 is the same for all recipient's in a PKCS#7 object, but not necessarily for recipients listed in other PKCS#7 objects of recipient attribute 404. In one embodiment, the recipient's private key 508 resides in a password protected file in a hard disk or on a protected smart card.

The plain text key 514 generated from the decrypted symmetric key 500 is utilized to decrypt (516) the encrypted access information 504. The access information, when decrypted (516), contains plain text seed data 506. The plain text seed data 506 is the same for all PKCS#7 objects in the array 411 of PKCS#7 objects $117_1 \ldots 117_N$.

In an alternate embodiment, the encrypted access information 504 also contains other access information including but not limited to access permission information. A more detailed description on access permissions information is described in a related copending application titled "Secure Document Access Control Using Recipient Lists" filed Aug. 28, 1998, Ser. No. 09/143,286.

A message digest algorithm (418) is used to digest, in a reproducible way, the plain text seed data 506 and the bytes 507 of all PKCS#7 objects $117_1 \ldots 117_N$ in the array 411. The result of the message digest algorithm (418) is a digest value 509 that, in one embodiment of this invention, is the symmetric key that is used to decrypt encrypted data including the PDF document/data 113 in the PDF file 110. In this embodiment, if the symmetric decryption key is shorter in byte-length than the digest value 509, then a corresponding number of bytes of the digest value 509 are used to decrypt data in the PDF file 110. In other embodiments of this invention, the message digest value 509 may be combined with other items of information from the encrypted access information 504 to generate one or more keys that may be used to decrypt one or more items of data 113 in the PDF file 110.

Message digest is well known in the art and includes for example, Secure Hash Algorithm version one (SHA-1) by the National Institute of Standards and Technology (NIST) and described in the Federal Information Processing Standards (FIPS) published in 1994 or Message Digest 5 (MD5) by R. L. Rivest in 1991 which is described in detail in Internet Request For Comments (RFC) 1321 dated April 1992.

Figure 6:
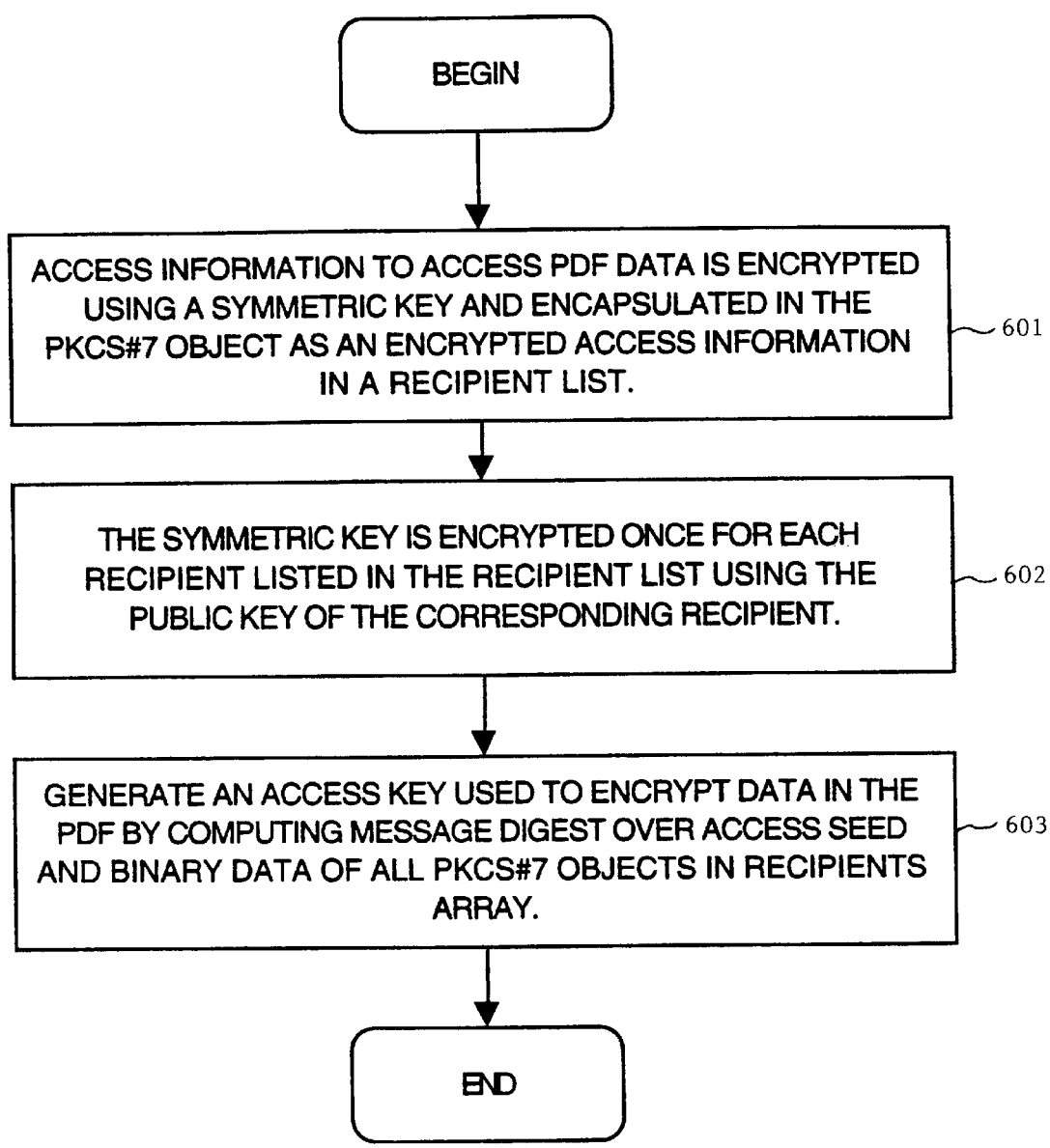
FIG. 6 is a flow diagram illustrating the general steps followed by the present invention in incorporating a PKCS#7 into a PDF file.

FIG. 6 is a flow diagram illustrating the general steps followed by the present invention in incorporating a PKCS#7 object into a PDF file. In step 601, access information to access a PDF document/data 113 is encrypted using a symmetric key 500 and encapsulated in the PKCS#7 object 117 as an encrypted access information 504 in a recipient list 115. In step 602, the symmetric key 500 is encrypted once for each recipient listed in the recipient list 115 using the public key 502 of a corresponding recipient. In step 603, an access key that is used to encrypt data 113 in the PDF file 110 is generated by computing a message digest over the access seed 506 and the binary data of all PKCS#7 objects 117 in the recipients array 411.

Figure 7:
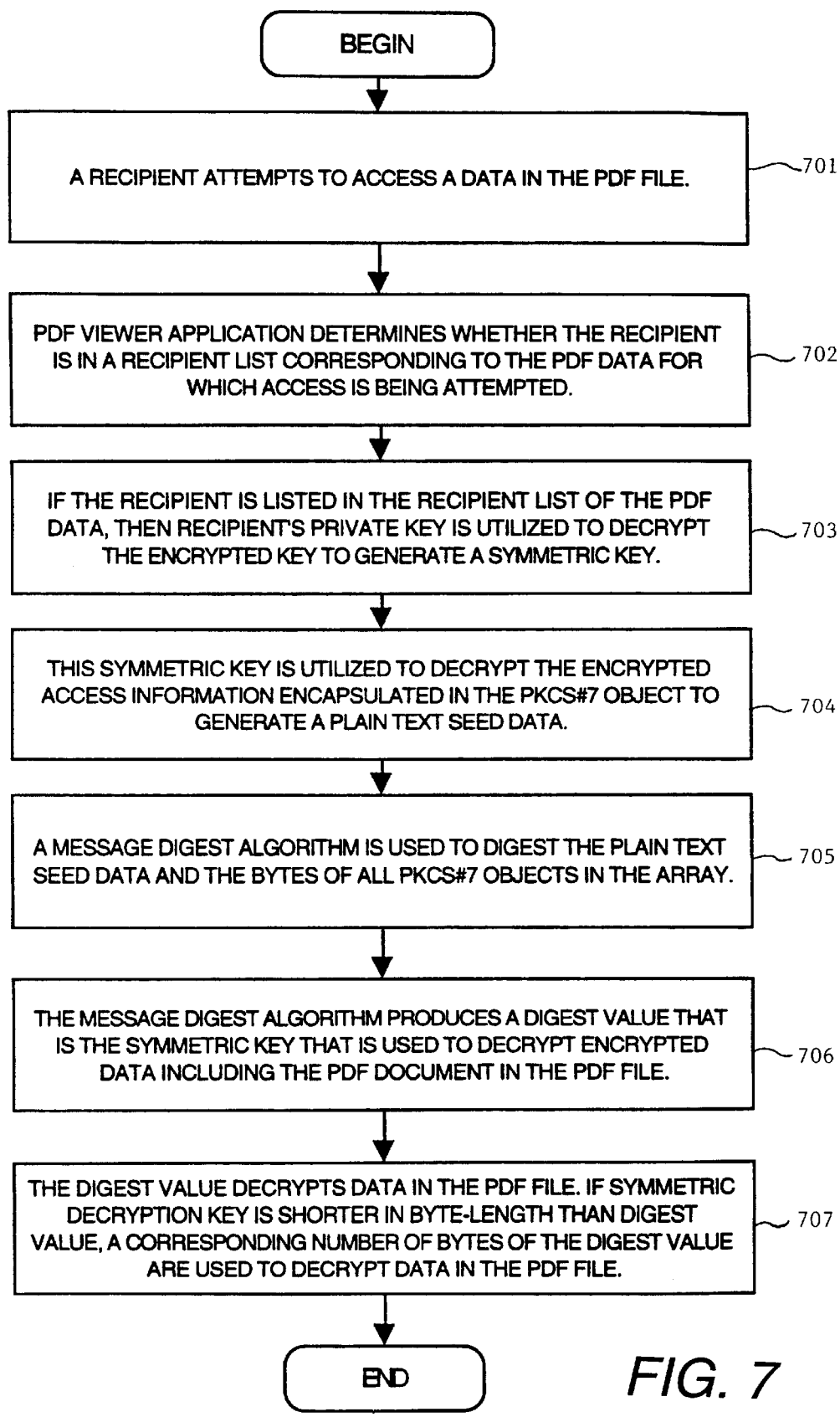
FIG. 7 is a flow diagram illustrating the general steps followed by the present invention in accessing the encrypted access information providing access to a PDF document/data.

FIG. 7 is a flow diagram illustrating the general steps followed by the present invention in accessing the encrypted access information providing access to a PDF document/data. In step 701, if a recipient attempts to access a data in the PDF file 110, then in step 702, the PDF viewer application 114 determines whether the recipient is in a recipient list 115 corresponding to the PDF document/data 113 for which access is being attempted.

In step 703, if the recipient is listed in the recipient list 115 of the PDF document/data 113, then the recipient's private key 508 is utilized to decrypt the encrypted key 512 to generate a symmetric key 500. In step 704, the symmetric key 500 is then utilized to decrypt the encrypted access information 504 encapsulated in the PKCS#7 object 117 to generate a plain text seed data 506. In step 705, a message digest algorithm (418) is used to digest, the plain text seed data 506 and the bytes 507 of all PKCS#7 objects $117_1 \ldots 117_N$ in the array 411.

In step 706, the message digest algorithm (418) produces a digest value 509 that is the symmetric key that is used to decrypt encrypted data including the PDF document/data 113 in the PDF file 110. In step 707, the digest value 509 decrypts data in the PDF file 110. If the symmetric decryption key is shorter in byte-length than the digest value 509, then a corresponding number of bytes of the digest value 509 are used to decrypt data in the PDF file 110.

Figure 8:
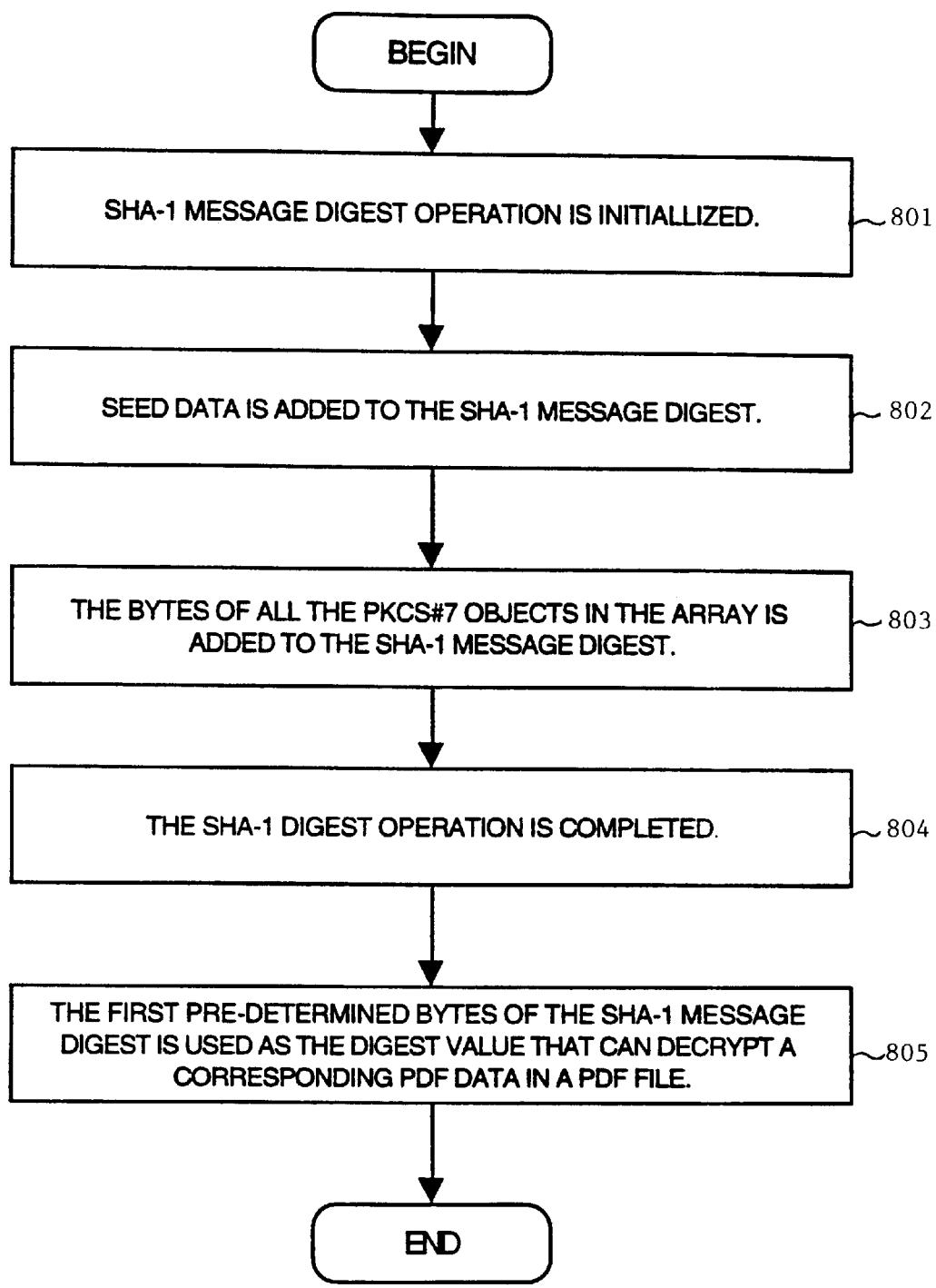
FIG. 8 is a flow diagram illustrating one embodiment of the general steps followed by the present invention in generating a document access key to access a PDF document/data.

FIG. 8 is a flow diagram illustrating one embodiment of the general steps followed by the present invention in generating a digest value 509 to access data including a PDF document/data in a PDF file. In step 801, an SHA-1 message digest operation is initialized. In step 802, seed data is added to the SHA-1 message digest. In step 803, the bytes 507 of all PKCS#7 objects $117_1 \ldots 117_N$ in the array 411 is added to the SHA-1 message digest. In step 804, the SHA-1 digest operation is completed. In step 805, the first predetermined bytes of the SHA-1 message digest is used as the digest value 509 that can decrypt a corresponding PDF document/data 113 in a PDP file 110.

What has been described is a method and apparatus to encapsulate a PKCS#7 object into a PDF file and utilize the PKCS#7 object to provide secure access by a recipient to the data 113 that is residing outside of the PKCS#7 object in a PDF file 110.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for providing secured access to data comprising:

embedding an access information into a Public Key Cryptography Standard number 7 (PKCS#7) object having a recipient list, said access information encrypted by a symmetric key, said access information being configured to provide access to data in a file, said symmetric key encrypted once for each recipient listed in said recipient list using a public key of each recipient;

encapsulating said PKCS#7 object into said file; and decrypting said access information using said symmetric key, said symmetric key decrypted using a private key of a predetermined one of a plurality of recipients listed in said recipient list, said decrypting being controlled by a viewer application to access said access information to provide said predetermined one of a plurality of recipients access to said data in said file.

2. The method of claim 1 wherein said PKCS#7 object is an entry in an array of plurality of PKCS#7 objets associated with said data.

3. The method of claim 1 wherein said access information comprises a plain text seed data configured to provide access to said data.

4. The method of claim 1 wherein said data is a portable document format (PDF) document.

5. The method of claim 1 wherein said file comprises a PDF file.

6. The method of claim 1 wherein said viewer application comprises a PDF viewer application.

7. The method of claim 1 further comprising determining whether said recipient is in said recipient list associated with said data if said recipient attempts to access said data.

8. The method of claim 7 further comprising denying said recipient access to said data if said recipient is not listed in said recipient list associated with said data.

9. The method of claim 8 further comprising performing a message digest on said plain text seed data and bytes of all PKCS#7 objects in said array.

10. The method of claim 9 wherein said performing further comprising generating a digest value configured to provide said recipient access to said data.

11. The method of claim 10 wherein said digest value is a symmetric key.

12. An apparatus for providing secured access to data comprising:

a Public Key Cryptography Standard number 7 (PKCS#7) object having,
  a recipient list listing a plurality of recipients designated to receive access to data,
  an encrypted access information configured to provide each said plurality of recipients access to said data, said encrypted access information embedded in said recipient list; and
a file encapsulating said PKCS#7 object and said data.

13. The apparatus of claim 12 wherein said PKCS#7 object is an entry in an array of PKCS#7 object associated with said data.

14. The apparatus of claim 13 wherein said recipient list further comprises a symmetric key encrypted once for each said plurality of recipients using a public key of each said plurality of recipients, said symmetric key configured to provide decrypt said encrypted access information.

15. The apparatus of claim 14 wherein the decrypted form of said encrypted access information comprises a plain text seed data configured to provide access to said data.

16. The apparatus of claim 15 further comprises a digest value generated from performing a message digest on said plain text seed data and bytes of all PKCS#7 objects in said array, said digest value configured to decrypt said data to provide said recipient access to said data.

17. A system for providing secured access to data stored in a computer-readable medium and executable by a computer, comprising:

a Public Key Cryptography Standard number 7 (PKCS#7) object having,
  a recipient list configured to list a plurality of recipients designated to receive access to data,
  an encrypted access information configured to provide each said plurality of recipients access to said data, said encrypted access information embedded in said recipient list; and
a file encapsulating said PKCS#7 object and said data.

18. The system of claim 17 wherein said PKCS#7 object is an entry in an array of PKCS#7 object associated with said data.

19. The system of claim 18 wherein said recipient list further comprises a symmetric key encrypted once for each said plurality of recipients using a public key of each said plurality of recipients, said symmetric key configured to provide decrypt said encrypted access information.

20. The system of claim 19 wherein the decrypted form of said encrypted access information comprises a plain text seed data configured to provide access to said data.

21. The system of claim 20 further comprises a digest value generated from performing a message digest on said plain text seed data and bytes of all PKCS#7 objects in said array, said digest value configured to decrypt said data to provide said recipient access to said data.

22. A computer readable media containing executable computer program instructions which when executed on a digital processing system causes the system to perform a method comprising:

embedding an access information into a Public Key Cryptography Standard number 7 (PKCS#7) object having a recipient list, said access information encrypted by a symmetric key, said access information being configured to provide access to data in a file, said symmetric key encrypted once for each recipient listed in said recipient list using a public key of each recipient;

encapsulating said PKCS#7 object into said file; and decrypting said access information using said symmetric key, said symmetric key decrypted using a private key of a predetermined one of a plurality of recipients listed in said recipient list, said decrypting being controlled by a viewer application to access said access information to provide said predetermined one of a plurality of recipients access to said data in said file.

23. The computer readable media of claim 22 wherein said PKCS#7 object is an entry in an array of plurality of PKCS#7 objets associated with said data.

24. The computer readable media of claim 22 wherein said access information comprises a plain text seed data configured to provide access to said data.

25. The computer readable media of claim 22 wherein said data is a portable document format (PDF) document.

26. The computer readable media of claim 22 wherein said file comprises a PDF file.

27. The computer readable media of claim 22 wherein said viewer application comprises a PDF viewer application.

28. The computer readable media of claim 22 further comprising determining whether said recipient is in said recipient list associated with said data if said recipient attempts to access said data.

29. The computer readable media of claim 28 further comprising denying said recipient access to said data if said recipient is not listed in said recipient list associated with said data.

30. The computer readable media of claim 29 further comprising performing a message digest on said plain text seed data and bytes of all PKCS#7 objects in said array.

31. The computer readable media of claim 30 wherein said performing further comprising generating a digest value configured to provide said recipient access to said data.

32. The computer readable media of claim 31 wherein said digest value is a symmetric key.

33. A method for providing secured access to a portable document format (PDF) data comprising:

embedding an access information into a data encapsulating and encrypting object having a recipient list, said access information encrypted by a symmetric key, said access information being configured to provide access to data in a PDF file, said symmetric key encrypted once for each recipient listed in said recipient list using a public key of each recipient;

encapsulating said data encapsulating and encrypting object into said PDF file; and decrypting said access information using said symmetric key, said symmetric key decrypted using a private key of a predetermined one of a plurality of recipients listed in said recipient list, said decrypting being controlled by a viewer application to access said access information to provide said predetermined one of a plurality of recipients access to said data in said PDF file.

34. A computer readable media containing executable computer program instructions which when executed on a digital processing system causes the system to perform a method comprising:

embedding an access information into a data encapsulating and encrypting object having a recipient list, said access information encrypted by a symmetric key, said access information being configured to provide access to a portable document format data in a PDF file, said symmetric key encrypted once for each recipient listed in said recipient list using a public key of each recipient;

encapsulating said data encapsulating and encrypting object into said PDF file; and decrypting said access information using said symmetric key, said symmetric key decrypted using a private key of a predetermined one of a plurality of recipients listed in said recipient list, said decrypting being controlled by a viewer application to access said access information to provide said predetermined one of a plurality of recipients access to said data in said PDF file.

* * * * *